United States Patent [19]
Cohen et al.

[11] Patent Number: 5,674,165
[45] Date of Patent: Oct. 7, 1997

[54] EXERCISING DEVICE FOR USE WITH A BABY STROLLER

[75] Inventors: Lauren Cohen, Huntington Woods; Robyn Elson, Bloomfield Hills; Wendy Pittman, Huntington Woods, all of Mich.

[73] Assignee: Echo Gear Inc., Southfield, Mich.

[21] Appl. No.: 579,734

[22] Filed: Dec. 28, 1995

[51] Int. Cl.⁶ ............................................. A63B 21/045
[52] U.S. Cl. ........................... 482/127; 482/44; 482/139; 482/904; 280/47.371
[58] Field of Search ........................ 280/47.38, 47.371, 280/304.1; 482/44, 62, 68, 118, 127, 128, 137, 139, 148, 904, 114–116, 69, 66, 67

[56] References Cited

U.S. PATENT DOCUMENTS

| | | |
|---|---|---|
| 3,564,626 | 2/1971 | Nelson . |
| 4,102,010 | 7/1978 | Lazazzero . |
| 4,169,591 | 10/1979 | Douglas . |
| 4,739,984 | 4/1988 | Dranselka . |
| 4,869,494 | 9/1989 | Lambert, Sr. . |
| 5,048,827 | 9/1991 | Caruso . |
| 5,062,651 | 11/1991 | Varieur . |
| 5,106,108 | 4/1992 | Howell . |
| 5,149,312 | 9/1992 | Croft et al. . |
| 5,242,179 | 9/1993 | Beddome et al. . |
| 5,269,544 | 12/1993 | Park . |
| 5,356,171 | 10/1994 | Schmidlin et al. . |
| 5,375,861 | 12/1994 | Gifford . |
| 5,431,614 | 7/1995 | Jeranson . |

*Primary Examiner*—Jeanne M. Clark
*Attorney, Agent, or Firm*—Gifford, Krass, Groh, Sprinkle, Patmore, Anderson & Citkowski, P.C.

[57] ABSTRACT

An exercising device is provided for use with a baby stroller of the type having a housing secured to the frame of a stroller, and an elongated arm pivotally attached at one end of the arm to the housing. The invention may further include an apparatus for preventing pivotal movement of the arm relative to the housing until a torsional force greater than a predetermined amount is applied to the other end of the arm. The housing is secured to the stroller frame by a pair of plates, each having a channel in one side. With the channels facing each other, the plates compressingly engage a portion of the stroller frame. The elongated arm is pivotally attached to the housing by a fixed cuff interposed within a movable cuff. The movable cuff further includes a driven member including an aperture through which the elongated arm is attached. The torsional force necessary to move the arm can be increased or decreased by rotating a knob attached to a threaded bolt which extends through the housing and a space defined by the engagement of the fixed and movable cuffs. A plurality of Belleville washers can compressingly engage a pair of bearing washers at eider end of the interior space. The baby stroller exercising device enables a user to obtain an upper body workout while walking a baby in a stroller.

14 Claims, 4 Drawing Sheets

EXERCISING DEVICE FOR USE WITH A BABY STROLLER

BACKGROUND OF THE INVENTION

I. Field of the Invention

The present invention relates generally to baby strollers and, more particularly, to an exercising device for use with a baby stroller.

II. Description of the Prior Art

Baby strollers are commonly used by people with young children as a safe and convenient way for transporting a child. Oftentimes, baby strollers are utilized by an adult to take the child on a long walk, thereby allowing both parent and child to enjoy the fresh air and surroundings.

Conventional strollers typically have a frame supported on a plurality of wheels, and a seat to contain the child. Typically, a fixed bar or handle will extend from the frame, so that the adult can grip the handles and propel the stroller forward when walking.

In the present environment, people are increasingly concerned about staying fit and healthy through exercise. However, many people often do not have the time to exercise. As a result, walking a baby in a stroller has become an excellent way, particularly for new mothers, to stay fit and healthy, while at the same time spending time with the child.

In walking a baby in a stroller, the baby and the stroller become part of the workout. The adult can increase the workout by power walking or jogging with the baby in the stroller, or can decrease the workout by walking at a normal or slow pace.

One disadvantage with exercising using a conventional stroller is that no upper body workout can be achieved. Although the walking motion allows for cardiovascular and lower body workout, the fixed handle construction of a conventional stroller precludes any arm movement, and prevents any kind of significant upper body workout. Attempts to exercise the arms while walking a baby in a conventional stroller is both awkward and unsafe for the child.

U.S. Pat. No. 5,375,861 discloses a baby stroller which allows a jogger to bring a baby along while jogging. The invention comprises a flexible connector attached at one end to the stroller and the other end to the jogger's body. The stroller is either pushed in front or pulled from behind by the jogger.

U.S. Pat. Nos. 5,062,651 and 5,106,108 each disclose a device for towing a child from behind while jogging. The carriage is connected to the jogger's body by means of a tow bar, and the carriage is pulled from behind.

A still further disadvantage of these previously known strollers is that the user cannot engage in a meaningful upper body workout including resistance training to achieve toning. At most, the user can simply move his or her arms through air.

A still further disadvantage of these previously known strollers is that when the child is towed from behind, the user can no longer supervise the child. This lack of supervision can substantially jeopardize the health and safety of the child in the stroller.

A still further disadvantage of these previously known strollers is that properly steering the stroller becomes extremely difficult when there is no place on the stroller for the user to place his or her hands.

SUMMARY OF THE PRESENT INVENTION

The present invention provides an exercising device for use with a baby stroller which overcomes all of the above-mentioned disadvantages of the previously known devices.

In brief, the baby stroller exercising device of the present invention comprises a housing, means for securing the housing to the frame of the baby stroller, an elongated arm, and means for pivotally attaching one end of the arm to the housing. Additionally, the invention may include means for preventing pivotal movement of the arm relative to the housing until a torsional force greater than a predetermined amount is applied to the other end of the arm.

In a preferred embodiment of the invention, the housing is attached to a portion of the stroller frame by means of two plates each having a channel along one side, so that when the plates are in abutment with each other, the stroller frame is compressibly engaged therebetween.

The elongated arm is pivotally attached to the housing by means of a fixed cuff attached to one of the plates, and a movable cuff which further includes a driven member adapted to receive one end of the elongated arm. The movable cuff is pivotally movable about the fixed cuff.

In a preferred embodiment of the invention, the means for preventing pivotal movement of the arm relative to the housing includes bearing washers on either end of the cavity created when the two cuffs are in engagement with each other, and resilient means in engagement with the bearing washers. A threaded bolt with a knob at one end extends therethrough. Therefore, a greater force is necessary to move the elongated arms as the resilient means are compressed against the bearing washers.

BRIEF DESCRIPTION OF THE DRAWINGS

A better understanding of the present invention will be had upon reference to the following detailed description, when read in conjunction with the accompanying drawing, wherein like referenced characters refer to like parts throughout the several views, and in which.

DETAILED DESCRIPTION OF A PREFERRED EMBODIMENT OF THE PRESENT INVENTION

Figure 1:
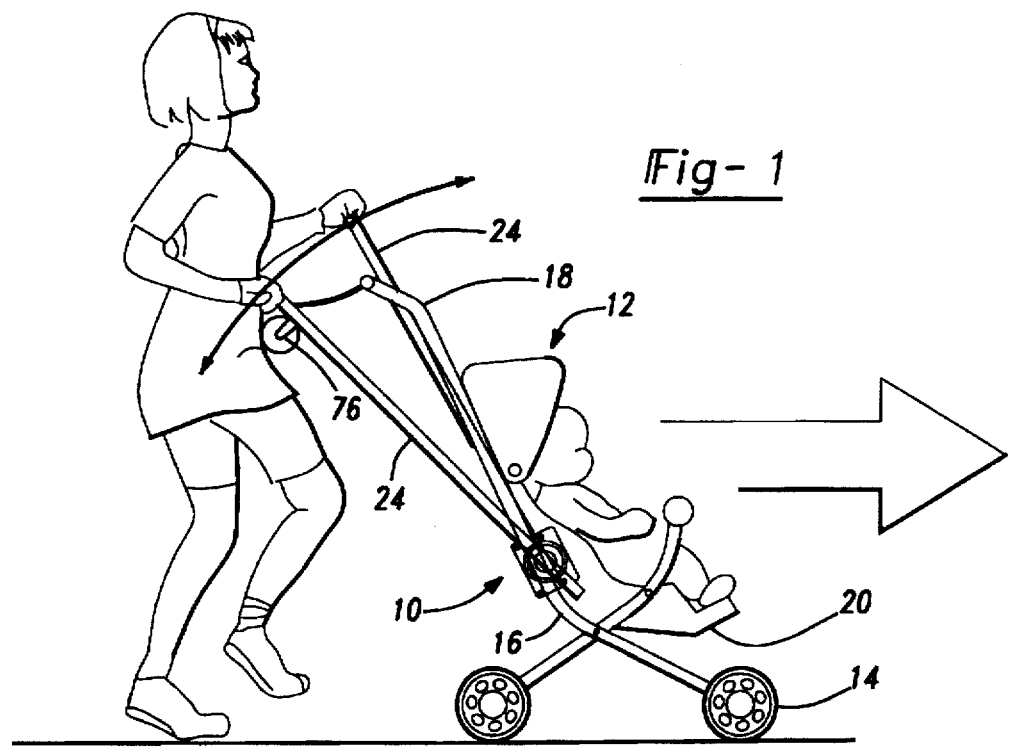
FIG. 1 is an environmental view illustrating the baby stroller exercise device of the present invention.

With reference first to FIG. 1, an illustration of a preferred embodiment of the exercising device 10 for use with a baby stroller 12 of the present invention is there shown. The baby stroller 12 can be of the conventional type having a plurality of wheels 14, and a frame 16. A fixed handle 18 may extend upwardly from the frame 16. The child is secured within a seat 20 attached to the frame 16.

With reference now to FIGS. 1–4, the baby stroller exercising device 10 is there shown in greater detail and includes a housing 22, means for securing the housing 22 to the frame 16, an elongated arm 24, and means for pivotally attaching one end 26 of the arm 24 to the housing 22.

Figure 5:
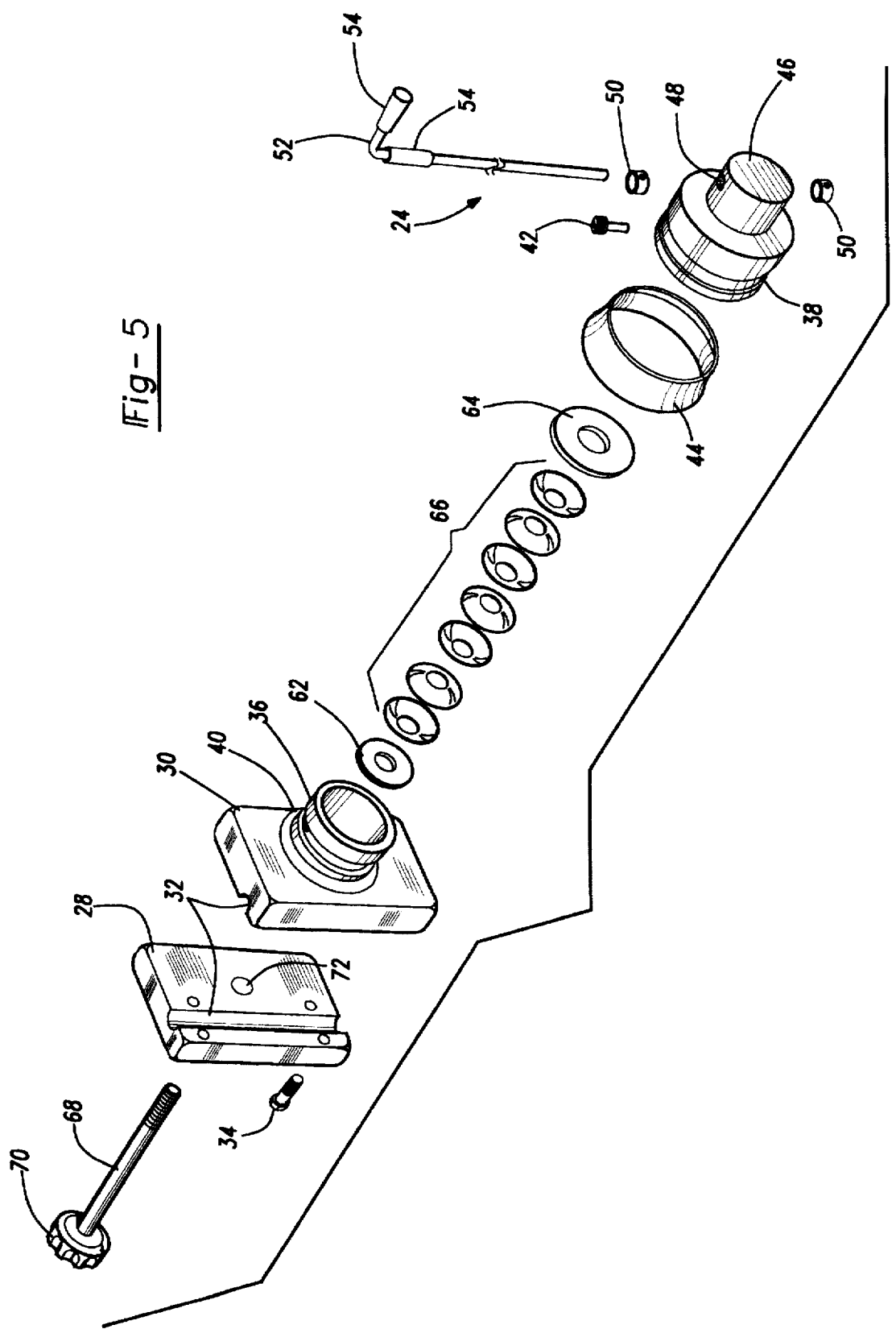
FIG. 5. is an exploded perspective view of the baby stroller exercising device of the present invention.

With reference now to FIG. 5, the housing 22 includes a first plate 28 and a second plate 30 adjacent to the first plate 28. Each of the plates 28, 30 has a channel 32 along one side. When the plates 28, 30 are in abutment with each other, with the channels 32 facing each other, the channels 32 are adapted to receive a portion of the frame 16 there between. The plates 28, 30 are secured to the frame 16 by means of one or more threaded fasteners 34 which extend through the first plate 28 and threadably engage the second plate 30, so that when the fasteners 34 are tightened, the channels 32 compressibly engage a portion of the frame 16.

Figure 2:
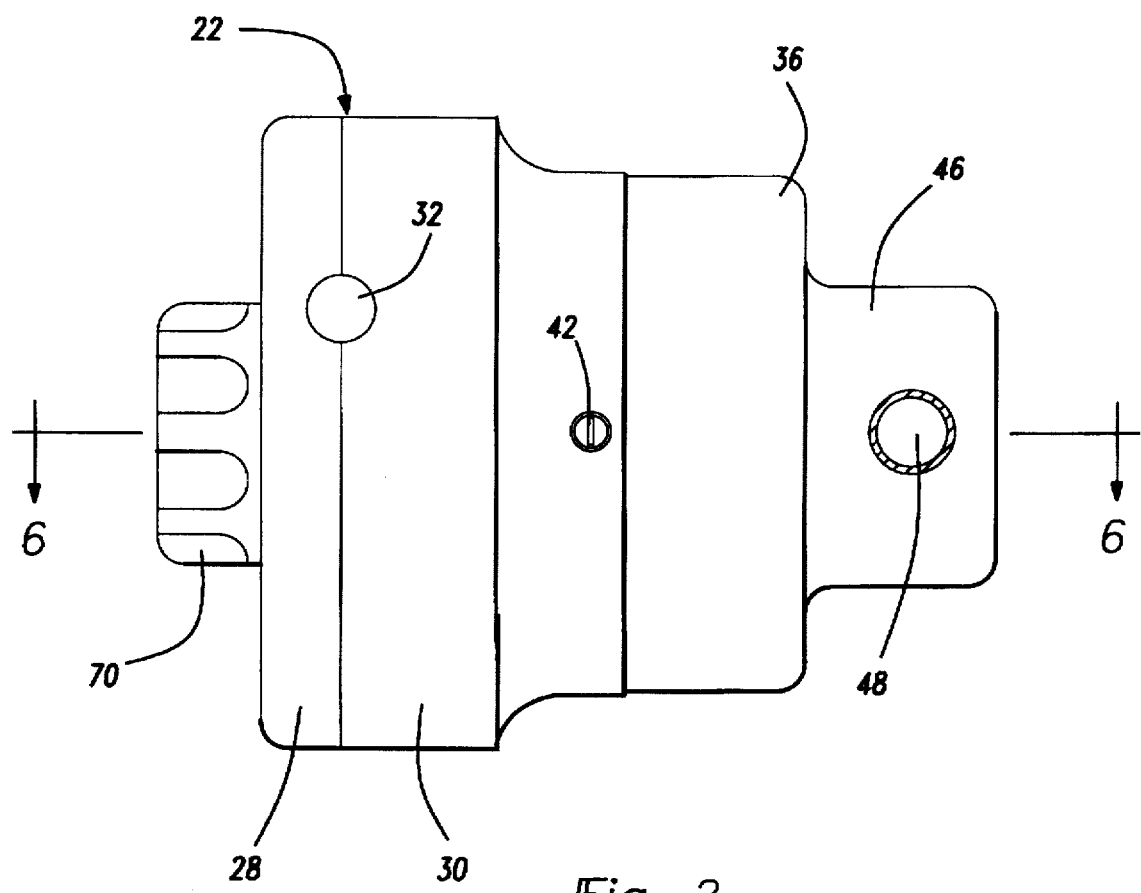
FIG. 2 is a top view of the baby stroller exercising device of the present invention.
Figure 3:
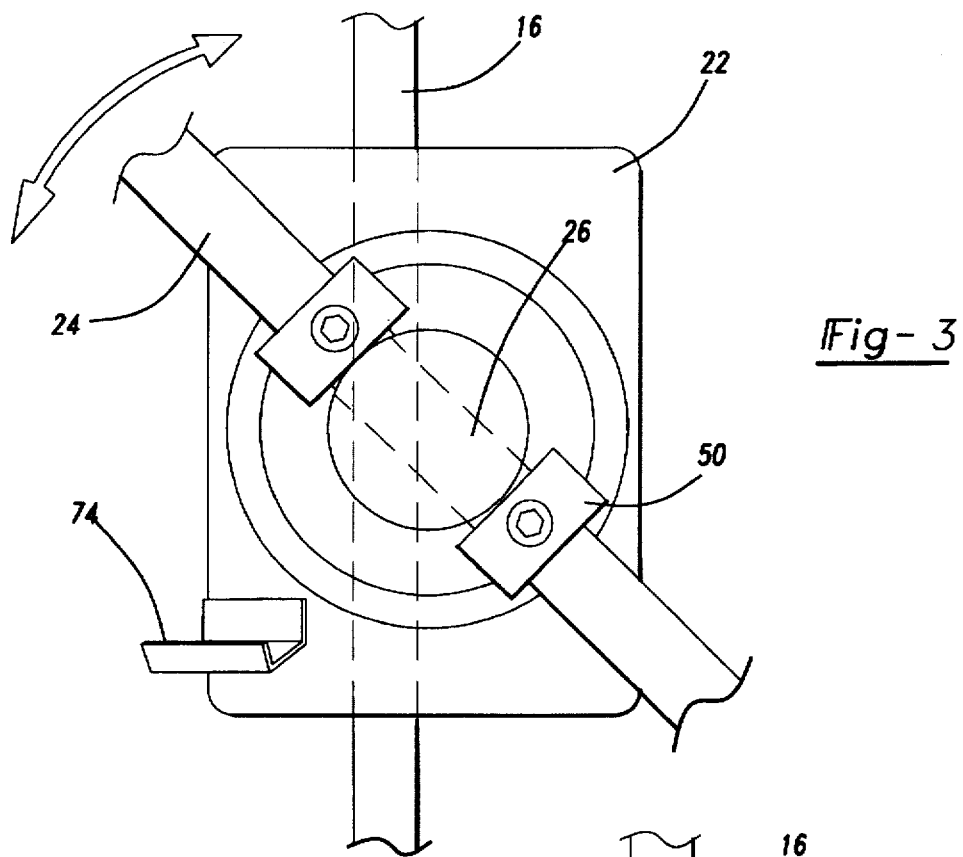
FIG. 3 is one side view of the baby stroller exercising device of the present invention.
Figure 4:
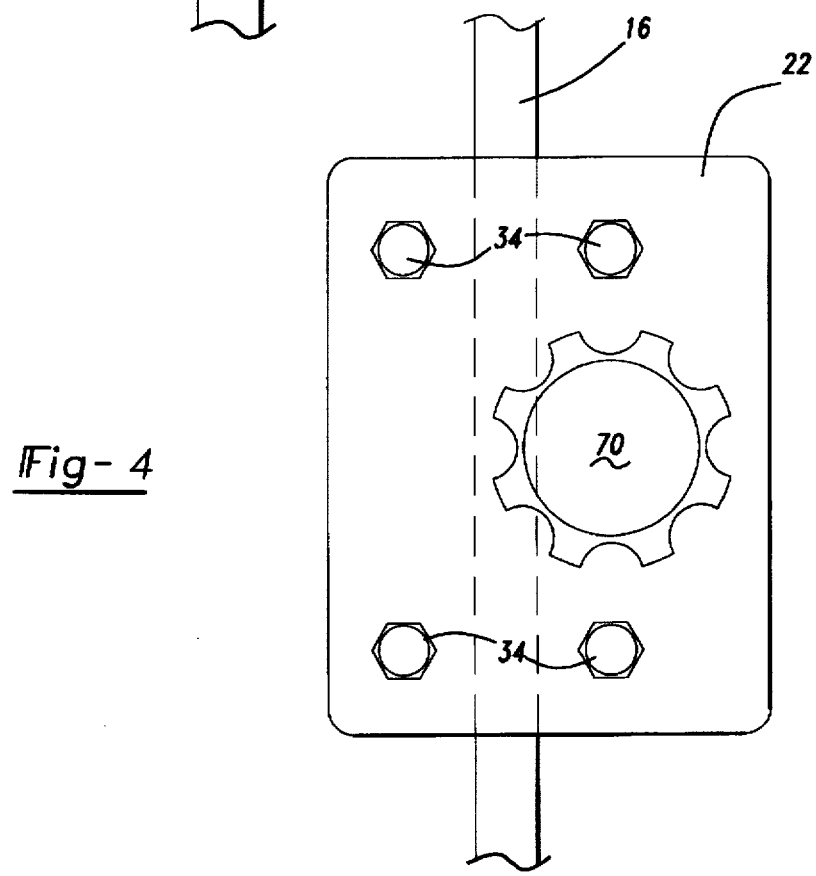
FIG. 4. is another side view of the baby stroller exercising device of the present invention.
Figure 7:
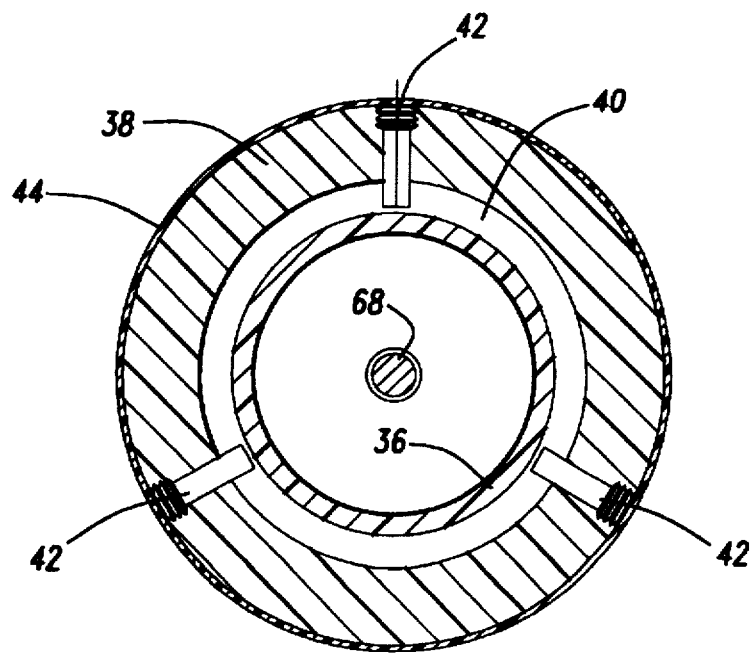
FIG. 7 is another cross-sectional view taken along line 7—7 of FIG. 6.

With reference now to FIGS. 2 and 5, a detailed view of the means for pivotally securing the elongated arm 24 to the housing 22 is there shown. A fixed cuff 36 extends outwardly from the second plate 30. A movable cuff 38 peripherally surrounds the fixed cuff 36. As best shown in FIG. 7, in one embodiment, the fixed cuff 36 has an annular groove 40. The movable cuff 38 is held in place over the fixed cuff 36 by means of one or more pins 42 secured to the movable cuff 38 and having a portion positioned within the annular groove 40 on the fixed cuff 36.

In one embodiment, a cylindrical shield 44 peripherally surrounds the junction between the fixed cuff 36 and movable cuff 38.

Still referring to FIG. 5, a driven member 46 extends outwardly from the movable cuff 38. The driven member 46 includes a throughbore 48 formed therethrough. One end 26 of the elongated arm 24 is received within the throughbore 48. The height of the elongated arm 24 relative to a user of the baby stroller exercising device 10 of the present invention can be adjusted by means of annular collars 50 secured to the arm 24 on opposite ends of the throughbore 48.

As shown in FIGS. 1 and 5, a user of the exercising device 10 grips the elongated arm 24 at the other end 52 of the arm 24. In one embodiment, the elongated arm 24 includes a plurality of hand gripping portions 54 which do not necessarily lie in the same line defined by the longitudinal axis of the arm. The placement of the hand gripping portions 54 along the elongated arm 24, as well as the configuration of the elongated arm 24, can take many variations, as is known in the art, and all are within the scope of the present invention.

Figure 6:
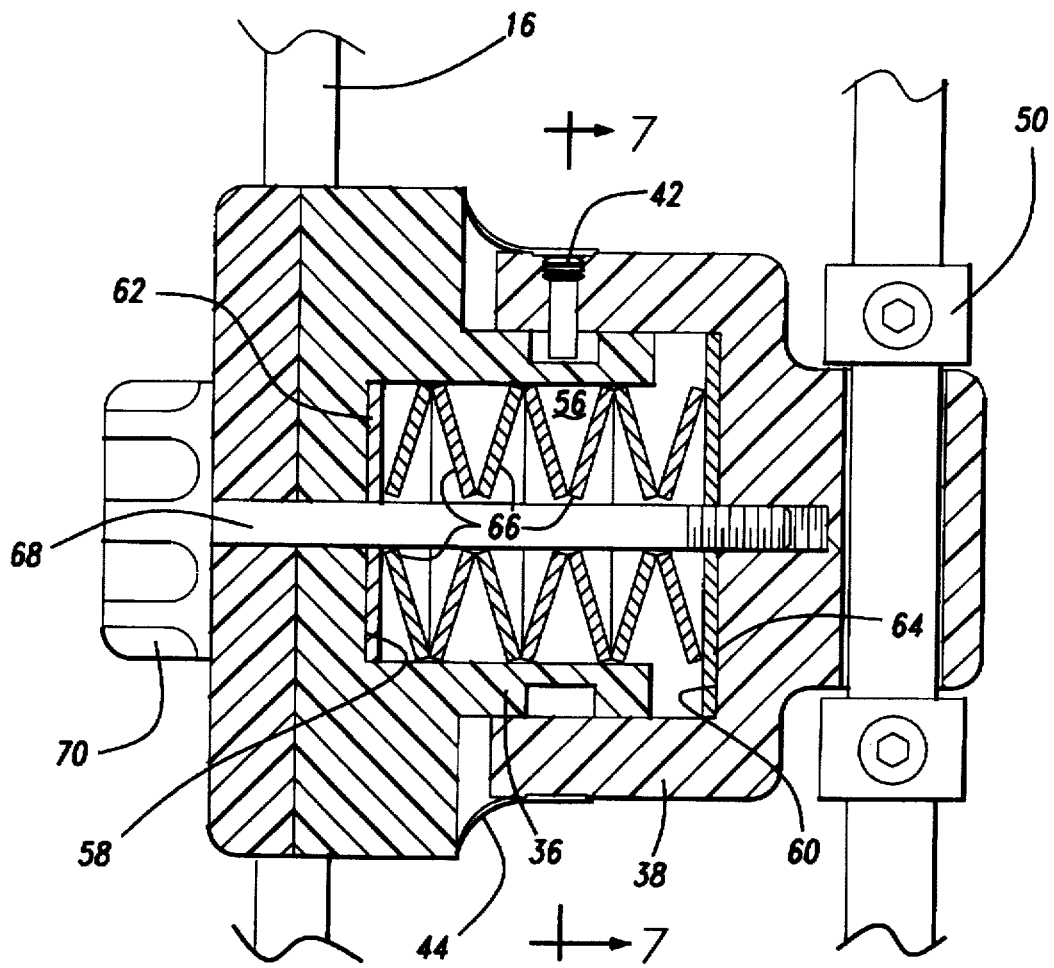
FIG. 6 is a cross-sectional view taken along line 6—6 of FIG. 2.

With reference now to FIGS. 5 and 6, the means for preventing pivotal movement of the arm 24 relative to the housing 22 until a torsional force greater than a predetermined amount is applied to the other end 52 of the arm 24 is there shown. Referring particularly to FIG. 6, the fixed cuff 36 in engagement with the movable cuff 38 form an interior chamber 56. The interior chamber 56 terminates in first and second surfaces 58, 60. A first bearing washer 62 abuts the first surface, and a second bearing washer 64 abuts the second surface 60. In one embodiment, resilient means such as a plurality of Belleville washers 66 are interposed between the first and second bearing washers 62, 64. Other resilient means can be used, as is known in the art.

Still referring to FIGS. 5 and 6, the torsional force necessary to move the elongated arm 24 is increased as the distance between the first and second interior surfaces 58, 60 is decreased. This results in the first and second bearing washer 62, 64 compressingly engaging the Belleville washers 66. The distance adjusting means includes a threaded bolt 68 having a knob 70 at one end. The threaded bolt 68 extends through an aperture 72 in the housing 22 and threadably engages the movable cuff 38. Thus, the distance between the first and second interior surfaces 58, 60 changes in response to the rotation of the knob 70. Increased compression of the Belleville washers 66 results in increased torsional force necessary to pivot the arm 24 and vice versa.

In operation, the baby stroller exercising device 10 of the present invention allows a user to get a total body workout while walking a baby. The user places his or her hands on the hand gripping portion 54 of the elongated arm 24. A plurality of hand gripping portions 54 may be provided at different portions of the elongated arm 24 in order to allow a user to exercise a variety of upper body muscle groups depending on the location of the hands on the hand gripping portions 54. As the user walks, he or she moves the elongated arms 24 back and forth thereby exercising the arms while retaining the ability to control and move the stroller 12. The torsional force necessary to move the elongated arms 24 can be increased or decreased by rotating the knob 70, thereby allowing a user to control the intensity of the upper body workout. An arm catch 74 may also be provided on the housing 22 to allow the user to release the elongated arms 24 without having the arms 24 fall and drag on the ground. Finally, an abdominal rest 76 may be attached to a fixed handle 18 of the stroller 12 for added stability and comfort.

Having described my invention, however, many modifications thereto will become apparent to those skilled in the art to which it pertains without deviation from the spirit of the invention as defined by the scope of the appended claims.

We claim:

1. In combination with a baby stroller having a frame, wheels, a baby's seat and a fixed upright handle attached to the frame and extending above the baby's seat, an exercising device comprising:

a housing, means for securing said housing to the frame below the upright handle, an elongated arm, means for pivotally attaching one end of said arm to said housing in a manner in which said arm extends adjacent to the frame and the upright handle, and an adjustable resistance means within said housing, for preventing pivotal movement of said arm relative to the frame until a torsional force greater than a predetermined amount is applied to the other end of said arm, whereby a user can selectively grasp the fixed handle or pivot the elongated arm for added exercise during use of the stroller.

2. The invention as defined in claim 1, wherein said housing comprises a first plate, and a second plate adjacent said first plate, each of said plates having a channel along one side, said channels facing each other when said sides of said plates are in abutment with each other, said channels adapted to receive a portion of said frame therebetween.

3. The invention as defined in claim 2, wherein said means for securing comprises at least one threaded fastener extending through said first plate and threadably engaging said second plate, so that upon tightening of said fastener, said channels compressibly engage said portion of said frame.

4. The invention as defined in claim 2, wherein said means for pivotally attaching comprises a fixed cuff extending outwardly from said first plate, said fixed cuff having an interior end, a movable cuff having an interior end and an exterior end, said movable cuff peripherally surrounding a portion of said fixed cuff and pivotally movable about said fixed cuff, said interior ends of said fixed and movable cuffs defining an interior space when said cuffs are in engagement with each other, said movable cuff further comprising a driven member extending outwardly from said exterior end of said movable cuff, and means for attaching said one end of said arm to said driven member.

5. The invention as defined in claim 4, wherein said means for attaching said one end of said arm to said driven member comprises a throughbore formed through said driven member and adapted to receive said arm therethrough, a pair of annular collars, and means for longitudinally, adjustably securing said collars to said arm on opposite ends of said throughbore.

6. The invention as defined in claim 4, wherein said means for preventing pivotal movement comprises a first surface adjacent said interior end of said fixed cuff, a second surface adjacent said interior end of said movable cuff, resilient means having first and second ends, said resilient means abutting said first and second surfaces and extending through said interior space, and means for adjusting a distance between said first and second surfaces, so that as said distance is decreased, said resilient means are compressed against said first and second surfaces, resulting in a greater torsional force needed to overcome said predetermined amount.

7. The invention as defined in claim 6, and further comprising first and second bearing washers, said first bearing washer being interposed between said first surface and said first end of said resilient means, and said second bearing washer being interposed between said second surface and said second end of said resilient means.

8. The invention as defined in claim 6, wherein said resilient means comprise a plurality of Belleville washers.

9. The invention as defined in claim 6, wherein said means for adjusting comprise a threaded bolt having a knob at one end, said bolt extending through an aperture in one cuff and threadably engaging the other cuff, so that said distance between said first and second surface changes in response to rotation of said knob.

10. The invention as defined in claim 4, and further comprising a cylindrical shield peripherally surrounding a junction between said fixed and movable cuffs.

11. The invention as defined in claim 4 wherein said fixed cuff has an annular groove, and further comprising at least one pin secured to said movable cuff, said pin having a portion positioned within said annular groove on said fixed cuff.

12. The invention as defined in claim 2, and further comprising an arm catch extending outwardly from a portion of said housing.

13. The invention as defined in claim 1, wherein on of said elongated arm comprises a plurality of hand-gripping portions, wherein one of said hand-gripping portions does not lie in the same line defined by the longitudinal axis of said elongated arm.

14. The invention as defined in claim 1, and further comprising an abdominal rest attached to the fixed handle.

* * * * *